United States Patent
Matsumoto et al.

[11] Patent Number: 5,771,000
[45] Date of Patent: Jun. 23, 1998

[54] METHOD OF RELEASING A STUCK AIR VALUE AND STICKING RELEASE APPARATUS

[75] Inventors: Kohji Matsumoto; Rikuo Urata, both of Akashi; Takao Wada, Takasago; Gohei Iijima, Kakogawa, all of Japan

[73] Assignee: Kawasaki Jukogyo Kabushiki Kaisha, Kobe, Japan

[21] Appl. No.: 742,949

[22] Filed: Nov. 1, 1996

[30] Foreign Application Priority Data

Nov. 9, 1995 [JP] Japan .................................... 7-317217

[51] Int. Cl.[6] .................................................. G08B 23/00
[52] U.S. Cl. ....................................... 340/501; 73/862.53
[58] Field of Search .................................. 340/501, 453, 340/450.1, 451; 251/129.1; 123/181.1; 137/552.7, 553; 303/3, 1; 364/426.031; 73/862.53

[56] References Cited

U.S. PATENT DOCUMENTS 3,942,373  3/1976  Rogers ..................................... 73/151
3,994,163  11/1976 Rogers ..................................... 73/151

FOREIGN PATENT DOCUMENTS 3-50225  3/1991  Japan .

*Primary Examiner*—Jeffery A. Hofsass
*Assistant Examiner*—Daryl C. Pope
*Attorney, Agent, or Firm*—Oliff & Berridge PLC

[57] ABSTRACT

The present invention provides a method of releasing a stuck air valve and also a sticking release apparatus that detects sticking of the air valve from a discrepancy in the waveform of an excitation current of a DC solenoid, then uses that current to release the sticking of the air valve. If sticking of the air valve is detected from the excitation current of the DC solenoid, a sticking release current flows either a predetermined number of times or for a predetermined period of time from a sticking release current supply portion of a current supply means, to release the sticking.

9 Claims, 1 Drawing Sheet

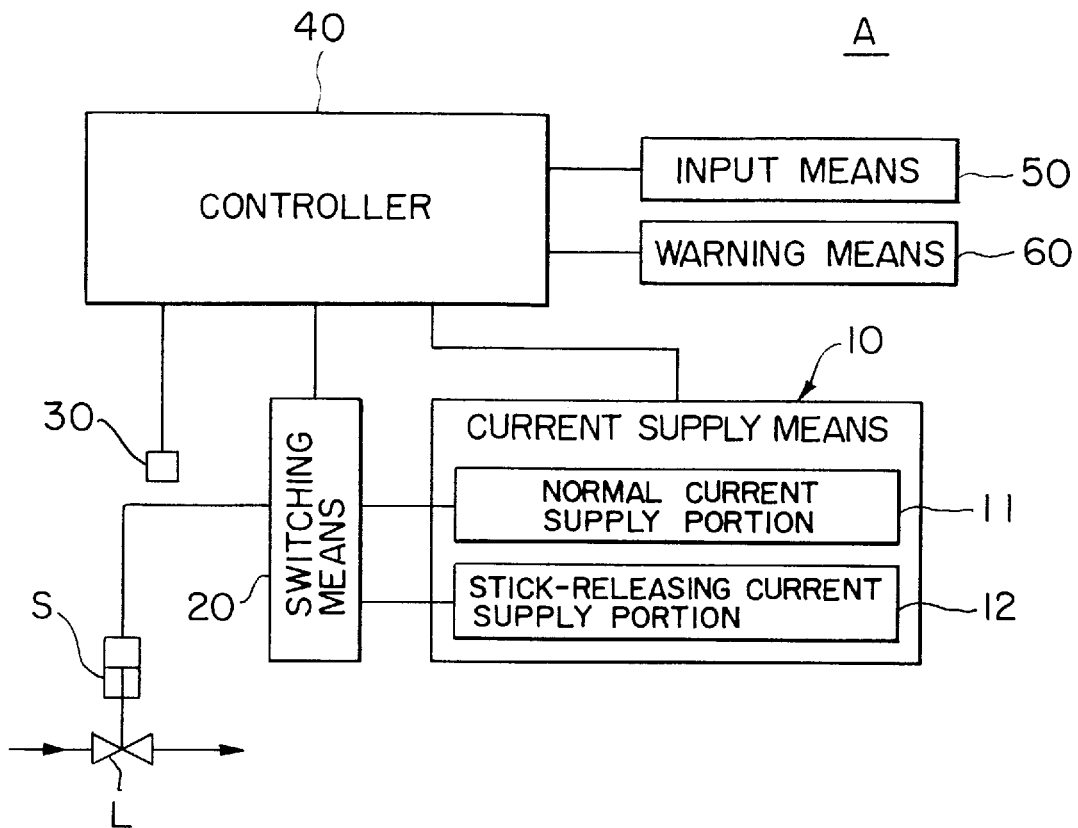
F I G. 1
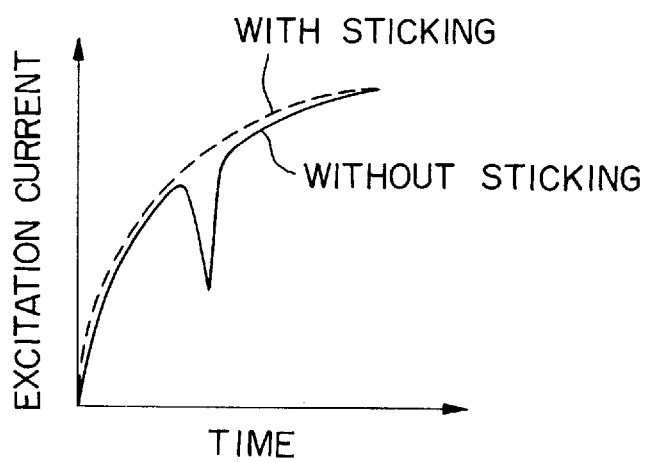
F I G. 2

METHOD OF RELEASING A STUCK AIR
VALUE AND STICKING RELEASE
APPARATUS

BACKGROUND OF THE INVENTION

The present invention relates to a method of releasing an air valve that has become stuck, and a sticking release apparatus thereof. More specifically, it relates to a method of releasing a stuck air valve that is driven by a DC solenoid, and a sticking release apparatus.

Technical Field

A type of air valve that is driven by a DC solenoid is used in the air-brake system of a railroad car. Unfortunately, the intrusion of dust and other foreign matter into the piping of this type of air valve tends make the valve stick, and thus it is liable to become inoperative. If that should happen, it is inevitable that the piston rod ceases to operate, without allowing the pressure within the brake cylinder to rise beyond a predetermined level, and an operation-completion lamp for this rod does not light. In such a case, the following operations are performed by the driver to release the sticking air valve:

1. Turn the brake-driving lever from the on-position to the off-position.
2. Return the brake-driving lever to the on-position.
3. If the sticking is not released after steps 1 and 2 above have been repeated a number of times, operate the emergency brake to halt the car.

However, since this method acts to release the sticking only after the driver has confirmed that there is a malfunction of the brake cylinder and piston rod by visually checking the air pressure acting on the cylinder, it takes several seconds before this sticking is detected. This causes a problem in that the operation of releasing the stuck valve is delayed.

It is known, however, that the rising waveform of the excitation current of the solenoid that drives the air valve is different when the air valve is stuck and when the air valve is not stuck (refer to Japanese Patent Laid-Open Publication No. Hei 3-50225). This difference in the waveform of the excitation current occurs as soon as the air valve becomes stuck so that it is to be expected that, if this excitation current waveform could be used to rapidly detect when the air valve sticks, the sticking could be released quickly and thus the above problem can be solved.

Unfortunately, no method or apparatus for using the rising current of the solenoid to release a stuck air valve has been proposed up to now.

SUMMARY OF THE INVENTION

The present invention was devised in the light of the above described problem with the conventional art. The main objective thereof is to provide a method of releasing a stuck air valve wherein the sticking of the air valve is detected from a discrepancy in the waveform of the excitation current of the DC solenoid, and this fact is used to release the sticking of the air valve. The present invention also provides an apparatus for releasing a stuck air valve.

A method of releasing a stuck air valve in accordance with this invention relates to a method of releasing a stuck air valve driven by a DC solenoid characterized in that, when it is detected from the excitation current of the solenoid that the air valve is stuck, the solenoid is excited by a sticking release current for a predetermined period of time.

In this case, the sticking release current is preferably an excitation current of a magnitude between two and three times that of the excitation current used in normal operation.

In addition, this method of releasing a stuck air valve in accordance with the present invention preferably issues an alarm if the sticking of the air valve is not released.

Similarly, a first aspect of an apparatus for releasing a stuck air valve in accordance with this invention relates to an apparatus for releasing a stuck air valve driven by a DC solenoid, wherein the apparatus comprises: sticking detection means for detecting from the excitation current of the solenoid whether or not the air valve is stuck; and sticking release means for supplying a sticking release current to the solenoid for a predetermined period of time in answer to a sticking detection signal from the sticking detection means.

A second aspect of an apparatus for releasing a stuck air valve in accordance with this invention relates to an apparatus for releasing a stuck air valve driven by a DC solenoid, wherein the apparatus comprises: sticking detection means for detecting from the excitation current of the solenoid whether or not the air valve is stuck; sticking release means for supplying a sticking release current to the solenoid for a predetermined period of time in answer to a sticking detection signal from the sticking detection means; and alarm means for issuing an alarm if the sticking of the air valve is not released by the sticking release current.

In this case, the sticking release current is preferably an excitation current of a magnitude between two and three times that of the excitation current used in normal operation.

When the air valve becomes stuck, this invention causes an excitation current of a magnitude between two and three times that of the excitation current used in normal operation to flow through the solenoid as a sticking release current. This causes the plunger of the air valve to be driven by a force that is approximately two to three times that of the force applied during normal operation, and, as a result, the plunger is driven against the sticking. In other words, the sticking of the air valve is released.

It should be noted that the provision of the alarm means to issue an alarm makes it possible to apply further measures quickly if the sticking cannot be released.

BRIEF DESCRIPTION OF THE DRAWINGS

FIG. 1 is a block diagram of a sticking release apparatus in accordance with the present invention; and FIG. 2 is a comparative graph of solenoid excitation waveforms.

DETAILED DESCRIPTION OF THE PREFERRED EMBODIMENTS

A preferred embodiment of the present invention will be described below with reference to the accompanying figures. It should be noted, however, that this invention is not to be taken as being limited to the embodiment described herein.

A block diagram of an embodiment of a sticking release apparatus (hereinafter simply referred to as "release apparatus") that uses the method of releasing a stuck air valve in accordance with the present invention is shown in FIG. 1. The main structural components of a release apparatus A comprise a current supply means 10 that supplies an excitation current (DC current) to a solenoid S that drives an air valve V, a switching means 20, an excitation current measuring means 30, and a controller 40.

The current supply means 10 comprises a normal current supply portion 11 that supplies a current (a normal operating current) that excites the solenoid S in a state in which sticking is not present (a normal state) and a sticking release current supply portion 12 that supplies a current (a sticking release current) that releases sticking when such sticking has occurred. This sticking release current supply portion 12 is designed to supply this sticking release current when the air valve V is stuck. This sticking release current could be the same as the normal excitation current, but is preferably two to three times the magnitude of that excitation current. The current supply means 10 is configured around a DC power source.

It should be noted that, although the normal current supply portion 11 and sticking release current supply portion 12 are provided within the current supply means 10 in the embodiment shown in FIG. 1, the configuration of the current supply means 10 is not limited thereto. A current control waveform PWM inverter could be provided within the current supply means 10 instead, with both the normal operating current and the sticking release current being supplied therefrom. In such a case, the switching means 20 would be integrated with the current supply means 10.

The switching means 20 switches the current from the current supply means 10 in accordance with an instruction from the controller 40, so that the sticking release current is supplied to the solenoid when the valve is stuck. This switching means could be a change-over switch.

The excitation current measuring means 30 measures changes in the excitation current supplied to the solenoid S, with the measurement result thereof being input to the controller 40. This excitation current measuring means 30 could be a transformer, for example.

The controller 40 is configured of components such as RAM, ROM, and an input-output interface, centered on a CPU. Data such as an instruction from an input means 50 and the measured value from the excitation current measuring means 30 is input to the controller 40, and instructions from the controller 40 are input to the current supply means 10, the switching means 20, and an alarm means 60. Programs and data that implement functions that will be described later are stored in the controller 40.

As should be clear from the above description, a sticking detection means of this release apparatus A is configured of the excitation current measuring means 30 and the controller 40. Similarly, a sticking release means thereof is configured of the switching means 20, the sticking release current supply portion 12 of the current supply means 10, and the controller 40.

The operation by which the release apparatus A of the above configuration releases the air valve V when it is stuck will now be described.

1. An air valve opening instruction is input from the input means 50.

2. The controller 40 turns on the current supply means 10 and also manipulates the switching means 20 to supply the normal operating current to the solenoid S, in accordance with input from the input means 50.

3. The excitation current supplied from the current supply means 10 through the switching means 20 to the solenoid S is measured by the excitation current measuring means 30 and the result is input to the controller 40.

4. The controller 40 compares the rising current that is input from the excitation current measuring means 30 with a rising pattern stored in a memory portion, to determine whether or not the air valve is sticking. A rise similar to that shown by the solid line in FIG. 2, in which a dip to a minimum value occurs partway during the rise, is interpreted as normal. A smooth increase in current similar to that shown by the broken line in FIG. 2, in which no such dip occurs, is interpreted as sticking.

5. If the controller 40 determines that the air valve V is sticking, it manipulates the switching means 20 to supply the sticking release current to the solenoid S for a predetermined period of time, such as a few hundred milliseconds.

6. The current now supplied to the solenoid S is measured by the excitation current measuring means 30 and the result is input to the controller 40.

7. The controller 40 again compares the rising current that is input from the excitation current measuring means 30 with the rising pattern stored in the memory portion, to determine whether or not the sticking of the air valve has been released.

8. If the sticking is not released even after steps 5 to 7 above have been repeated a number of times, the controller 40 instructs the alarm means 60 to issue an alarm.

9. The alarm means 60 issues the alarm as instructed by the controller 40.

In this manner, this embodiment of the present invention detects any sticking of the air valve V by the current flowing through the solenoid S that drives the air valve V, so that such sticking can be detected rapidly. Since such sticking is released automatically by the sticking release current, the sticking is released in a simple and rapid manner. In addition, if this sticking fails to be released, an alarm is generated thereby, so that further measures can be taken quickly.

As described above, the present invention makes it possible to detect sticking of the air valve from the current flowing through the solenoid that drives the air valve, and also ensures that the sticking release current is automatically supplied by the controller when such sticking is detected, to release such sticking automatically. Thus the present invention has the effect of detecting and releasing the sticking rapidly, and the operation thereof can be made simple.

Since the present invention also preferably issues an alarm if the sticking cannot be released, it has the further advantage of enabling further measures to be taken quickly if the sticking cannot be released.

What is claimed is:

1. A method of releasing a stuck air valve when said air valve, driven by a DC solenoid, is stuck, said method comprising the steps of:

using said DC solenoid for driving said air valve during normal operation of said air valve;

detecting that said air valve is stuck from an irregular pattern of an excitation current induced in said DC solenoid;

exciting said DC solenoid by supplying a sticking release current for a predetermined period of time to said DC solenoid; and driving said air valve with said excited DC solenoid, thereby releasing said stuck air valve.

2. The method of releasing a stuck air valve of claim 1, wherein said sticking release current is an excitation current of a magnitude between two and three times that of an excitation current used in normal operation.

3. The method of releasing a stuck air valve of claim 1, wherein an alarm is issued if said stuck air valve is not released.

4. An apparatus for releasing a stuck air valve when said air valve, driven by a DC solenoid, is stuck, said apparatus comprising:

a DC solenoid for driving said air valve during normal operation;

sticking detection means for detecting that said air valve is stuck from an irregular pattern of an excitation current induced in said DC solenoid and providing a sticking detection signal if said air valve is stuck; and sticking release means for supplying a sticking release current for a predetermined period of time to said DC solenoid in response to said sticking detection signal to excite said DC solenoid and drive said air valve, thereby releasing said air valve.

5. An apparatus for releasing a stuck air valve when said air valve, driven by a DC solenoid, is stuck said apparatus comprising:

a DC solenoid for driving said air valve during normal operation;

sticking detection means for detecting that said air valve is stuck from an irregular pattern of an excitation current induced in said DC solenoid and providing a sticking detection signal if said air valve is stuck;

sticking release means for supplying a sticking release current for a predetermined period of time to said DC solenoid in response to said sticking detection signal to excite said DC solenoid and drive said air valve, thereby releasing said air valve; and alarm means for issuing an alarm if said stuck air valve is not released by said sticking release current.

6. The apparatus for releasing a stuck air valve of claim 5, wherein said sticking release current is an excitation current of a magnitude between two and three times that of an excitation current used in normal operation.

7. The method of releasing a stuck air valve as claimed in claim 1, wherein an excitation current of said irregular pattern of excitation current induced in said DC solenoid is proportional to time.

8. The apparatus for releasing a stuck air valve as claimed in claim 4, wherein an excitation current of said irregular pattern of excitation current induced in said DC solenoid is proportional to time.

9. The apparatus for releasing a stuck air valve as claimed in claim 5, wherein an excitation current of said irregular pattern of excitation current induced in said DC solenoid is proportional to time.

* * * * *